Dec. 22, 1959  L. M. BUTTERFIELD  2,918,204
DISPLAY CARTON FOR FRUIT AND VEGETABLES
Filed July 15, 1957
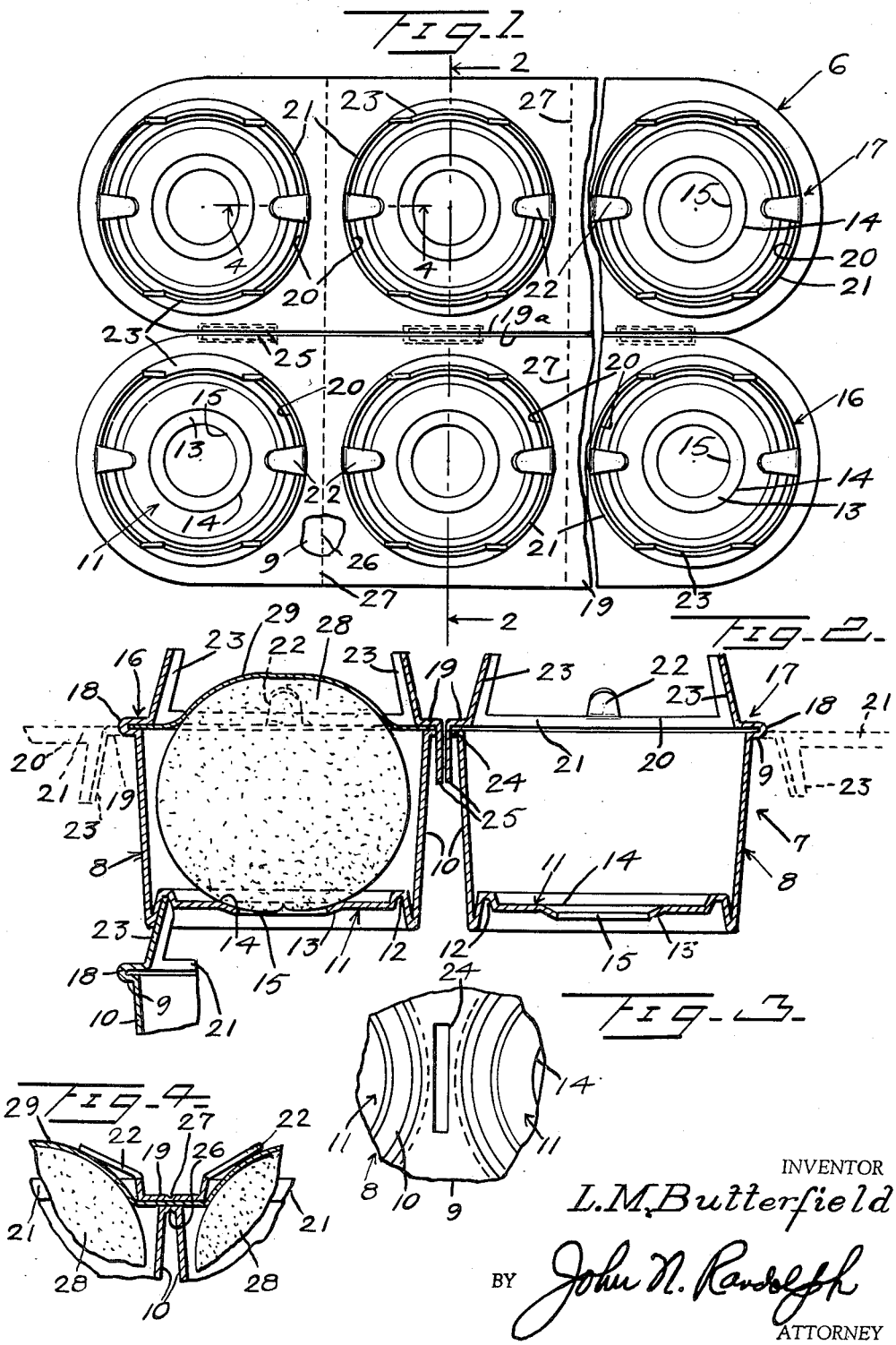
INVENTOR
L.M. Butterfield
BY John N. Randolph
ATTORNEY

United States Patent Office 2,918,204
Patented Dec. 22, 1959

2,918,204

DISPLAY CARTON FOR FRUIT AND VEGETABLES

Louis M. Butterfield, Kittery, Maine

Application July 15, 1957, Serial No. 671,797

7 Claims. (Cl. 229—2.5)

This invention relates to a carton for fruit and vegetables such as apples, peaches and tomatoes, in which such produce may be safely shipped with a minimum risk of damage thereto, and which carton may also be used for displaying the produce contained therein, when offered to the retail trade, and as a package in which the produce can be delivered to the retail customer.

Still a further object of the invention is to provide a carton of inexpensive construction which is capable of being divided readily into sections so that a section of the carton and the produce contained therein can be delivered to the retail customer after separation from the remainder of the carton.

A further object of the invention is to provide a carton including hinged top portions capable of being readily swung to open positions for removing the fruit and vegetable items therefrom and having means for engaging the fruit supported in a bottom portion of the carton to hold the fruit or vegetables against movement relative to the carton and to prevent damage thereto.

Still another object of the invention is to provide a fruit and vegetable carton which is so constructed that a number of cartons, filled with fruit and vegetables, may be stacked one upon the other without risk of crushing or otherwise damaging the contents.

Various other objects and advantages of the invention will hereinafter become more fully apparent from the following description of the drawing, illustrating a presently preferred embodiment thereof, and wherein:

Figure 1 is a fragmentary plan view of the display carton;

Figure 2 is an enlarged cross sectional view thereof, taken substantially along a plane as indicated by the line 2—2 of Figure 1;

Figure 3 is a fragmentary plan view of a central portion of a part of the lower portion of the carton, and Figure 4 is an enlarged vertical sectional view, taken substantially along a plane as indicated by the line 4—4 of Figure 1.

Referring more specifically to the drawing, the carton in its entirety is designated generally 6 and may be formed of a suitable inexpensive material such as fiber, paperboard or plastic and which is preferably molded in a conventional manner. The carton 6 includes a bottom section 7 composed of a plurality of cup-like upwardly opening receptacles 8 which are integrally connected together at their open tops or rims by a horizontal top wall 9 of the bottom section or body portion 7. The receptacles 8 are preferably arranged in two rows each of which can include from two to twelve or more such receptacles. Each receptacle 8 includes a frusto-conical downwardly tapered side wall 10, and a bottom, designated generally 11, which is upwardly offset relative to the bottom edge of the wall 10. The bottom 11 includes an annular downwardly opening groove 12 formed in the marginal portion thereof adjacent the lower portion of the wall 10 of said receptacle 8. The bottom 11 is also preferably provided with a centrally disposed downwardly flared annular portion 13 to form a convexly rounded upwardly facing annular surface 14, for a purpose which will hereinafter be described. The downwardly flared annular portion 13 may define a central opening 15 in the bottom 11, or the central portion of the bottom 11 may be solid.

The carton 6 includes covers 16 and 17 of identical construction, each of which covers one longitudinal half of the body portion or bottom section 7 and which are integrally joined to the longitudinal side edges of the top wall 9 by being folded inwardly and back upon said top wall to form the hinges 18. Each cover or lid 16 and 17 includes a substantially flat top wall 19 of approximately one-half the width of the top wall 9, each of which has a row of openings 20 located directly above the receptacles 8 on which said lid is disposed, when the lid 16 or 17 is in a closed position, as seen in Figures 1 and 2. The openings 20 are somewhat smaller in diameter than the open tops of the receptacles 8 and are preferably formed by upwardly flared annular portions 21 of the top wall 19 of the lid.

Each upwardly flared annular portion 21 is provided with a pair of elongated relatively narrow extensions forming fingers 22 which are disposed in diametrically opposed relation to one another. Each flared portion 21 is additionally provided with two upwardly and inwardly inclined integral extensions 23, which are likewise disposed in opposed relationship to one another and spaced equally from the fingers 22. The extensions 23 are of substantial length circumferentially of the flared portion 21, so that said extensions 23 form substantially rigid upwardly projecting lugs, whereas the fingers 22 are relatively flexible as compared to the extensions 23.

The top wall 9 of the body portion 7, between each two transversely aligned receptacles 8, is provided with an elongated slot 24. The slots 24 are disposed substantially in alignment with one another and have their longitudinal axes disposed longitudinally of the carton 6. The inner longitudinal free edges 19a of the top walls 19 of the lids 16 and 17 are provided with longitudinally spaced transversely aligned extensions forming tongues 25. A tongue 25 of each lid 16 and 17 extends downwardly through each slot 24 when the lids are in closed positions, as seen in Figures 1 and 2, for retaining the carton in a closed position.

The top wall 9 of the body portion 7 is provided with a score line or line of perforations 26 between the longitudinally spaced receptacles 8, which score lines or perforations 26 extend transversely from side to side of the top wall 9. In a like manner, the top walls 19 are provided with transversely extending scored lines or lines of perforations 27 which are disposed directly above the scoring or perforations 26 and extend between the annular flanges 21.

From the foregoing it will be readily apparent that the lids 16 and 17 may be swung upwardly and outwardly relative to the body portion 7 about the hinges 18 to the open dotted line positions thereof as seen in Figure 2. With the carton 6 thus opened, an item 28, such as an apple, peach or tomato, may be stored in each receptacle 8. The annular convexly rounded bottom portion 14 is provided as a seat or bearing surface for the produce item 28, as seen in Figure 2. The fingers 22 may be pressed downwardly and inwardly against the tops of the items 28 to cooperate with the annular bearing surfaces 14 to hold the produce items 28 substantially immovable in the receptacles 8, after the lids 16 and 17 have been returned to closed positions. If desired, a sheet 29 of flexible transparent material may be placed over each longitudinal half of the body portion 7, before the lids 16 and 17 are returned to closed positions, for covering and protecting the exposed upper portions of the produce items 28, or said transparent strips 29 may be omitted.

The filled carton 6 may be shipped from the point of origin of the produce 28 and will afford adequate protection for the contents during shipment and storage. The cartons 6 may be stacked one upon the other, as illustrated in Figure 2, with the lugs 23 of each carton 6 engaging in the downwardly opening grooves 12 of another carton 6 which is superimposed thereon, and by means of which the stacked cartons are maintained in spaced apart relation to one another so that the produce items 28 will not be crushed or otherwise damaged and will not come in contact with one another or with a part of another carton.

It will also be apparent that the carton 6 can be used for displaying the produce 28 for sale and, in selling to the retail trade, the contents of a part of the carton may be sold and said part of the carton torn off along appropriate score lines 26 and 27, from the remainder of the carton, for delivery to the purchaser. Thus, even numbers of the items 28, such as two, four, six or more may be sold and delivered with the carton portion in which said items are contained. Each such carton portion will include a lid section 16 and a lid section 17 having a hinged portion 18 and at least one tongue 25 for each such section of either lid.

It will be readily apparent that the carton 6 including the individual receptacles 8 thereof may be made in various sizes for accommodating produce items 28 of different sizes and shapes.

Various other modifications and changes are contemplated and may be resorted to, without departing from the function or scope of the invention as hereinafter defined by the appended claims.

I claim as my invention:

1. A produce carton comprising a body portion including a plurality of individual open top receptacles and a substantially flat top wall formed integral with and having portions surrounding the open tops of said receptacles and connecting said receptacles together in spaced apart relationship to one another and in two rows, substantially flat lids formed integral with and hingedly connected to longitudinal side edges of said top wall and each of a width substantially equal to one-half the width of the body portion and each disposed over one row of the receptacles in a closed position thereof, each of said lids having a row of openings disposed directly above said receptacles in a closed position of the lid, said lid openings being of a smaller diameter than the open tops of the receptacles, and means connecting the lids to the body portion for retaining the lids in closed positions.

2. A carton as in claim 1, said means comprising slots formed in said top wall between the two rows of receptacles and with the axes of said slots disposed longitudinally of the carton, and said lids having inner longitudinal free edges provided with extensions forming tongues which extend downwardly through said slots for latching the lids in closed positions, each of the slots being engaged by a tongue of each lid when both lids of the carton are in closed positions.

3. A carton as in claim 1, each of said lids having upwardly and inwardly inclined annular flanges, each flange defining one of the lid openings.

4. A produce carton comprising a body portion including a plurality of individual open top receptacles and a top wall formed integral with the open tops of said receptacles and connecting said receptacles together in spaced apart relationship to one another and in two rows, lids formed integral with and hingedly connected to longitudinal side edges of said top wall and each of a width substantially equal to one-half the width of the body portion and each disposed over one row of the receptacles in a closed position thereof, each of said lids having a row of openings disposed directly above said receptacles in a closed position of the lid, said lid openings being of a smaller diameter than the open tops of the receptacles, and means connecting the lids to the body portion for retaining the lids in closed positions, each of said receptacles including an annular side wall and a bottom, said receptacle bottoms having downwardly opening grooves located adjacent marginal edges thereof, and said lids having substantially rigid integral extensions projecting upwardly from the openings thereof and forming lugs, at least two lugs of a lid opening being adapted to engage the groove of a receptacle bottom disposed thereabove for supporting the cartons in stacked spaced apart relation to one another.

5. A carton as in claim 4, each receptacle bottom having a centrally disposed annular upwardly facing convexly rounded portion forming a bearing surface for a produce item contained therein.

6. A carton as in claim 1, and a flexible strip of transparent material detachably mounted and clamped between each lid and the longitudinal half of the body portion disposed therebeneath, when the lids are in closed positions, for covering and sealing the exposed upper portions of the produce items which project through the lid openings.

7. A produce carton comprising a body portion including a plurality of individual open top receptacles and a top wall formed integral with the open tops of said receptacles and connecting said receptacles together in spaced apart relationship to one another and in two rows, lids formed integral with and hingedly connected to longitudinal side edges of said top wall and each of a width substantially equal to one-half the width of the body portion and each disposed over one row of the receptacles in a closed position thereof, each of said lids having a row of openings disposed directly above said receptacles in a closed position of the lid, said lid openings being of a smaller diameter than the open tops of the receptacles, and means connecting the lids to the body portion for retaining the lids in closed positions, said receptacles including bottoms having downwardly opening grooves, and said lids having substantially rigid upstanding projections adapted to engage in said grooves for supporting the cartons stacked in superimposed spaced apart relation to one another.

References Cited in the file of this patent
UNITED STATES PATENTS

| | | |
|---|---|---|
| 1,522,325 | Pitts | Jan. 6, 1925 |
| 1,698,072 | Russell | Jan. 8, 1929 |
| 1,969,802 | Koppelman | Aug. 14, 1934 |
| 2,089,728 | Brogden | Aug. 10, 1937 |
| 2,560,847 | Chaplin | July 17, 1951 |
| 2,634,039 | Schwertfeger | Apr. 7, 1953 |
| 2,636,660 | Brown | Apr. 28, 1953 |
| 2,706,075 | Buttery | Apr. 12, 1955 |
| 2,728,484 | Farrington | Dec. 27, 1955 |